Patented Aug. 12, 1924.

1,504,225

UNITED STATES PATENT OFFICE.

FREDERIC WILLIAM VESEY FITZGERALD, OF CAVERSHAM, ENGLAND.

PROCESS FOR THE PREPARATION OF COMMERCIAL PRODUCTS FROM BLOOD.

No Drawing. Application filed May 19, 1921. Serial No. 470,975.

*To all whom it may concern:*

Be it known that I, FREDERIC WILLIAM VESEY FITZGERALD, a subject of the King of the United Kingdom of Great Britain and Ireland, residing at "Quedgeley," Derby Road, Caversham, in the county of Oxford, England, have invented certain new and useful Improvements in Processes for the Preparation of Commercial Products from Blood (for which I have filed applications in Great Britain, No. 17,057, July 8, 1919; No. 24,181, Oct. 3, 1919; No. 32,741, Nov. 19, 1920; France, July 31, 1920; Germany, Aug. 5, 1920; Belgium, Sept. 6, 1920; Italy, Aug. 19, 1920; Austria, Aug. 12, 1920; Czechoslovakia, Aug. 18, 1920; Australia, Sept. 13, 1920; Spain, Aug. 10, 1920; Canada, Aug. 16, 1920; Argentina, Sept. 6, 1920), of which the following is a specification.

This invention relates to processes for the preparation from blood of solid or moldable products.

According to this invention, blood is partially dehydrated at a regulated temperature to the extent hereinafter specified and is thoroughly exposed to air and the desiccation is then continued with as little exposure of the body of the material to air as is conveniently practicable until a substantially dry, solid residue is obtained. This residue is then pulverized and agglomerated by heat or pressure with or without incorporation with other materials or substances.

In carrying out my invention, I employ defibrinated blood or blood whose fluidity has been preserved by the addition of a citrate or similar means. Preservatives may also be added.

The invention may be carried out for example, in the following manner.

The blood to be treated is stirred with a mechanical stirrer in an open vessel for from approximately 17 to 30 hours at a temperature of 115° to 120° F. Instead of stirring the liquid in an open vessel, a convenient alternative device for obtaining the desired result is to cause the blood to flow in a thin film over a tray heated to the above indicated temperature. The tray is provided with alternate baffles causing the liquid to flow in a zig-zag manner from an inlet in one corner to an outlet in the other, the inlet and outlet being preferably connected to a closed container in which the blood is heated so as to produce a continuous flow through the tray due to the rise of the hotter liquid and the fall of the cooler liquid as it passes to the outlet on the tray.

The temperature at which dehydration, according to the above indicated method, is carried out should not be allowed to rise above 120° F. otherwise premature coagulation or undue thickening may occur before dehydration and surface exposure have been carried to the desired extent. A lower temperature than that indicated is undesirable as the time required for dehydration would be lengthened in consequence with the result that the blood would be liable to putrefy.

The dehydration should be carried to such a point that coagulation to a stiff jelly can be effected in from half an hour to two or three hours by the addition of about 2 to 4 per cent of 40 per cent formaldehyde. When the blood has been dehydrated to the above specified degree, the desiccation is then continued at the same temperature, either in vacuo or with as little exposure to the atmosphere as is conveniently practicable, until a solid residue is attained. This residue is then pulverized and agglomerated by heat and pressure or is incorporated with other materials in any suitable manner.

According to a preferred method of carrying out the invention the desiccation is effected by exposing the partially dehydrated blood in a thin layer or film to the same temperature, means being taken to prevent undue access of air to the body or substratum of the material, until a solid residue is obtained. This exposure in a thin layer should therefore be carried out in such a manner that the surface film is unbroken or changed as little as possible.

I will now describe certain of the commercial applications of the present invention.

*Insulating compounds.*

To produce an insulating material resin or gums are incorporated with the solid product previously described with or without the addition of a proportion of the liquid products obtained by the processes described and claimed in the specification of the application Serial No. 403,113, after which the whole can be worked up in any suitable manner.

Horn and ivory substitute.

The solid product may be subjected to heat and pressure in molds of the desired shape.

What I claim is:—

1. A process for obtaining solid or moldable substances from blood of which the fluidity has been preserved according to which the blood to be treated is partially dehydrated at a regulated temperature not substantially exceeding 120° F. and thoroughly exposed to air and when the dehydration has been carried to such a point that coagulation to a stiff jelly can be effected in from half an hour to two or three hours by the addition of 2 to 4 per cent of 40% formaldehyde, the desiccation is then continued with as little exposure of the body of the material to air as is conveniently practicable until a solid residue is obtained.

2. A process for obtaining solid or moldable substances from blood of which the fluidity has been preserved according to which the blood to be treated is partially dehydrated at a regulated temperature not substantially exceeding 120° F. and thoroughly exposed to air and, when the dehydration has been carried to such a point that coagulation to a stiff jelly can be effected in from half an hour to two or three hours by the addition of 2 to 4 per cent of 40% formaldehyde, the desiccation is then continued with as little exposure of the body of the material to air as is conveniently practicable until a solid residue is obtained, which residue is subsequently agglomerated by heat and pressure to the form desired.

3. A process for obtaining solid or moldable substances from blood of which the fluidity has been preserved according to which the blood to be treated is partially dehydrated at a regulated temperature not substantially exceeding 120° F. and thoroughly exposed to air and, when the dehydration has been carried to such a point that coagulation to a stiff jelly can be effected in from half an hour to two or three hours by the addition of 2 to 4 per cent of 40% formaldehyde, the desiccation is then continued with as little exposure of the body of the material to air as is conveniently practicable until a solid residue is obtained, which residue is incorporated with other materials and then agglomerated by heat and pressure to the form desired.

4. Solid or moldable products produced by the process claimed in claim 1.

5. A process for obtaining solid or moldable substances from blood which consists in preserving the fluidity of the blood partially dehydrating the blood at a regulated temperature with thorough exposure to the air, adding formaldehyde to produce a stiff jelly, and continuing desiccation with a minimum of exposure to air to obtain a dry solid residue.

6. A process for obtaining solid or moldable substances from blood which consists in preserving the fluidity of the blood partially dehydrating the blood at a regulated temperature with thorough exposure to the air, adding formaldehyde to produce a stiff jelly, and continuing desiccation with a minimum of exposure to air to obtain a dry solid residue, and agglomerating the residue by heat and pressure to the form desired.

7. A process for obtaining solid moldable substances from blood of which the fluidity has been preserved according to which the blood to be treated is partially dehydrated at a regulated temperature not substantially exceeding 120° F. and thoroughly exposed to air and, when the dehydration has been carried to such a point that coagulation to a stiff jelly can be effected in from half an hour to two or three hours by the addition of 2 to 4 per cent of 40% formaldehyde, the desiccation is then continued with as little exposure of the body of the material to air as is conveniently practicable until a solid residue is obtained, which residue is incorporated with other materials and then agglomerated by pressure to the form desired.

In testimony whereof I affix my signature in the presence of two witnesses.

FREDERIC WILLIAM VESEY FITZGERALD.

Witnesses:
RICHARD TREVOR TUDOR OWEN,
MARGUERITE FULLS.